US005680400A

United States Patent [19]

York

[11] Patent Number: 5,680,400

[45] Date of Patent: Oct. 21, 1997

[54] SYSTEM FOR HIGH-SPEED TRANSFER OF A CONTINUOUS DATA STREAM BETWEEN HOSTS USING MULTIPLE PARALLEL COMMUNICATION LINKS

[75] Inventor: Kenneth L. York, Huntingdon Valley, Pa.

[73] Assignee: Unisys Corporation, Blue Bell, Pa.

[21] Appl. No.: 454,910

[22] Filed: May 31, 1995

[51] Int. Cl.[6] ........ H04J 3/24

[52] U.S. Cl. ........ 370/473; 370/465; 370/475; 370/536; 395/200.13

[58] Field of Search ........ 370/94.1, 60, 60.1, 370/95.1, 118, 100.1, 84, 85.6, 85.7, 85.3, 13, 108, 85.1, 112, 465, 473, 475, 536; 395/275, 200.13, 824; 364/260, 260.3; 375/260

[56] References Cited

U.S. PATENT DOCUMENTS

| | | | |
|---|---|---|---|
| 4,475,192 | 10/1984 | Fernow et al. | 370/94 |
| 4,583,219 | 4/1986 | Riddle | 370/60 |
| 5,163,046 | 11/1992 | Hahne et al. | 370/79 |
| 5,222,216 | 6/1993 | Parish et al. | |
| 5,293,378 | 3/1994 | Shimizu | 370/112 |

OTHER PUBLICATIONS

Morgan, S.P., "Queuing Disciplines and Passive Congestion Control in Byte-Stream Networks", Proceedings of IEEE Infocom Apr. 1989.

*Primary Examiner*—Wellington Chin
*Assistant Examiner*—Melissa Kay Carman
*Attorney, Agent, or Firm*—John B. Sowell; Mark T. Starr; John F. O'Rourke

[57] ABSTRACT

A high speed data transfer mechanism for transferring files from a transmission host across a data link to a receiver host. First, data is presented to a data splitter. The data splitter separates the input data stream into N separate substreams by packaging data into packets, which may be of different sizes. As data is packetized, each packet is sent and presented to a separate data transmitter. Data is sent to the array of transmitter in round-robin fashion such that the data is first presented to the first transmitter, then to the second transmitter, and so on until each transmitter has been sent a packet, then the first transmitter is sent another, and so on, until all data packets have been sent to a transmitter. A receiving side of the mechanism then initializes as many receivers as needed, or as many data receive substreams as are required using as many receivers as are available, ideally an equal number to the transmitters. A substream reassembly unit reassembles data packets into a final output stream.

8 Claims, 3 Drawing Sheets

SYSTEM FOR HIGH-SPEED TRANSFER OF A CONTINUOUS DATA STREAM BETWEEN HOSTS USING MULTIPLE PARALLEL COMMUNICATION LINKS

BACKGROUND OF THE INVENTION

1. Field of the Invention

The present invention relates to a high speed data transfer mechanism for transferring files across single data paths.

2. Related Art

Common approaches to transferring data at very high speeds involve sending the data in a single data stream between two points. For example, a large corporation may have a computer network in city A and a different network in city B connected over a single data path interface; typically a phone link. Standard interfaces between networks, such as the X3T9 American National Standard for Information systems (ANSI) specification, permits point-to-point communication between two host computers (or networks) at speeds approaching 10-to-1000 Mbits/sec. However, the communication link may be under-utilized due to interface and/or processing bottlenecks causing periods when no data can be transferred. These bottlenecks typically occur during the time the data is being transferred. Bottlenecks are caused by resource conflicts, data dependencies, source fetching, data storing, data preparation and instruction dependencies between the host sending files and the host receiving them.

So while there are many transmitting and receiving devices that can transmit and receive data at very high data rates, host-to-host devices are often unable to send and receive a file, or incapable of sending and receiving a file, (i.e., host-to-host) at rates equal to that of the transmitting/receiving devices.

Therefore, what is needed is an economical system and method to achieve as high a data transfer rate as possible (in excess of 80% of the available transport services) as measured from the time a file is prepared to be sent, to the time it is available at the host receiving the file; not measured by the file transfer rate, which focuses on the speed of a transmitting device.

SUMMARY OF THE INVENTION

The present invention is directed to a high speed data transfer mechanism for transferring files from a transmission host across a data link(s) to receiver host.

Data is presented to a data splitter. The data splitter separates the input data stream into N separate substreams by packaging data into packets, which may be of different sizes. As data is packetized, each packet is sent and presented to a separate data transmitter, one for each data substream, via an input queue to each transmitter. Each transmitter queue has a significant amount of packet storage available to hold input packets.

Data is sent to the array of transmitters in round-robin fashion such that the data is first presented to the first transmitter, then to the second transmitter, and so on until each transmitter has been sent a packet, then the first transmitter is sent another, and so on, until all data packets have been sent to a transmitter. Each data transmitter processes packets and transmits them sequentially to one or more data receivers. There may be more than one physical media between the transmitters and receivers, or a single transmission link may be used with all data substreams being multiplexed together. As each substream is marked with its unique identity, all data packets in a given substream have the identity of the substream.

Depending upon the transmission link and transmission and receiver configurations, one or more transmitters may be used with one or more receivers with one or more transmission links. There is no requirement to have a one-to-one mapping of these entities. However, it is the intent of this design that transmitters and receivers be typically initially configured in a one-to-one fashion with the ability of any transmitter or receiver to handle multiple data substreams if necessary in the event of any equipment or link failure.

In this design, the transmit side of the mechanism has communicated with the receive side before data is transmitted as to the number of logical data substreams which will be used and what exactly will be the identity of each substream and the order that each substream will be used. Once these data substream identities have been communicated, data transmission mode begins. The receiving side of the mechanism then initializes as many receivers as needed, or actually as many data receive substreams as are required using as many receivers as are available, ideally an equal number to the transmitters.

While each receiver has been primed to receive a given data substream, the receivers each receive data into a separate packet receive queue. Receivers guarantee correct ordering of received packets in their respective queues. Receivers also guarantee that data is integrity checked and will handle retransmitted packets as needed.

The substream reassembly unit polls each receiver queue for data packets. Receiver queues are polled in the prearranged order. The substream reassembly unit reassembles data packets into the final output stream.

Further features and advantages will become apparent after reading the Detailed Description section and associated figures below.

DETAILED OF THE DESCRIPTION OF THE PREFERRED EMBODIMENTS

Figure 1:
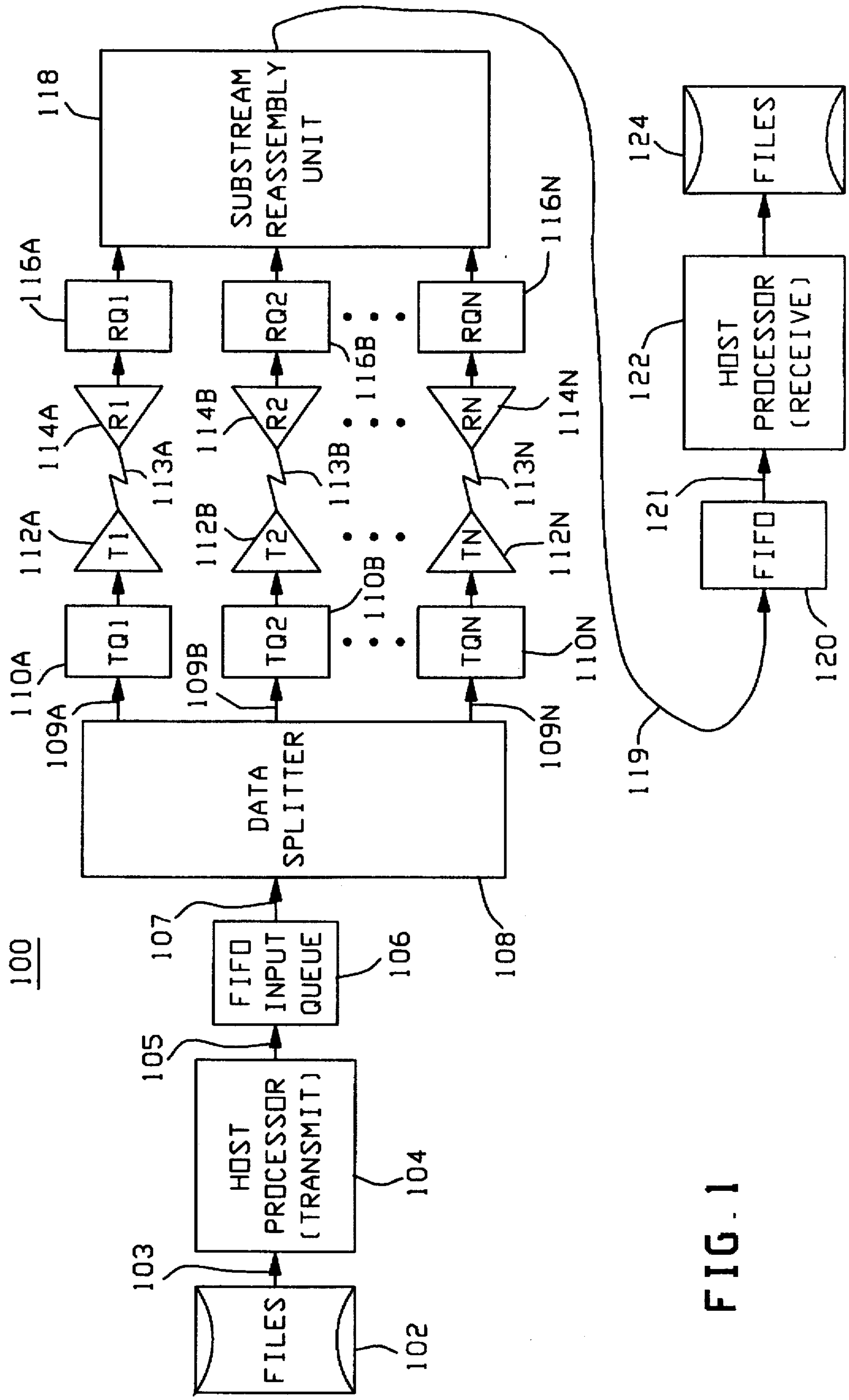
FIG. 1 is a block diagram of a high performance communication system for sending files from a transmit host processor to a receive host processor, according to a preferred embodiment of the present invention.

FIG. 1 is a block diagram of an embodiment of a high performance communication system 100 for sending files 102 from a transmit host processor 104 to a receive host processor 122. The high performance communication system 100 takes a single input data stream 105, 107 from the host processor 104 and splits the single input data stream 105, 107 into multiple parallel streams 109 which are then presented to one or more independent physical data transmitters 112 and one or more independent physical data receivers 114. It should be noted that an equal number of transmitters and receivers is not required. The input data stream may be created by processes at the host processor 104 or more typically, data is read from a high performance disk unit. By splitting the data up into manageable sizes, and using multiple transmitters and receivers, it is possible to send data in a much more efficient manner than a brut force, point-to-point, single data stream approach.

Transmitters 112 and receivers 114 are connected to queues 110 and 116, each having the ability store multiple packets of data. After data enters receiver queues 116 it is read by a substream reassembly unit 118, which reconfigures the data into a single continuous data stream and sent to a FIFO 120. The receive host processor 122 then reads the data from the FIFO 120 and acts on the file (i.e., stores the file, prints the file, etc.).

In a preferred embodiment the high performance communications system 100 is offered by Unisys Corporation, Blue Bell, Pa., U.S.A., under a suite of products called FTRapid. The communication system 100 provides an efficient bulk file transfer capability between computer systems. Typically, these computer systems are separated by one or more links, such as a telephone company provided line or link.

Figure 2:
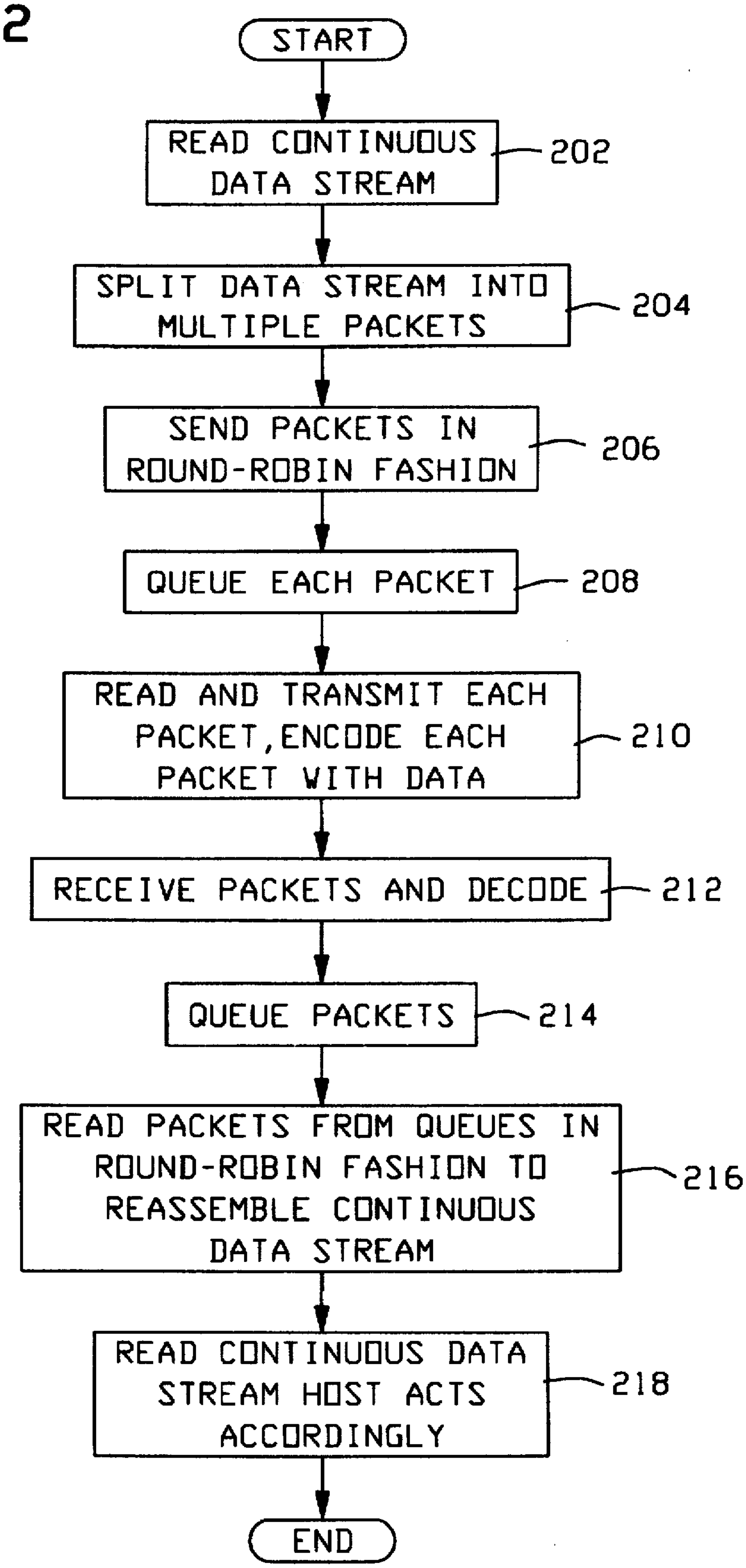
FIG. 2 is a flow chart illustrating the operation of the high performance communication system.

The operation of the high performance communication system 100 of FIG. 1 will now be described in more detail with reference to the flow chart of FIG. 2. In step 202 of FIG. 2, a file is sent from the receive host processor 104 to the First-In-First-Out queue (FIFO) 104 as a single continuous data stream via bus 105. To transfer a file, the host processor 104 sends a continuous data stream of data, at rates around 1-to-10 mega bytes per second. The FIFO's buffer size is usually allocated to be between 200 Kbytes and a megabyte. The data splitter 108 reads the single continuous data stream via bus 107 from FIFO 104.

Figure 3:
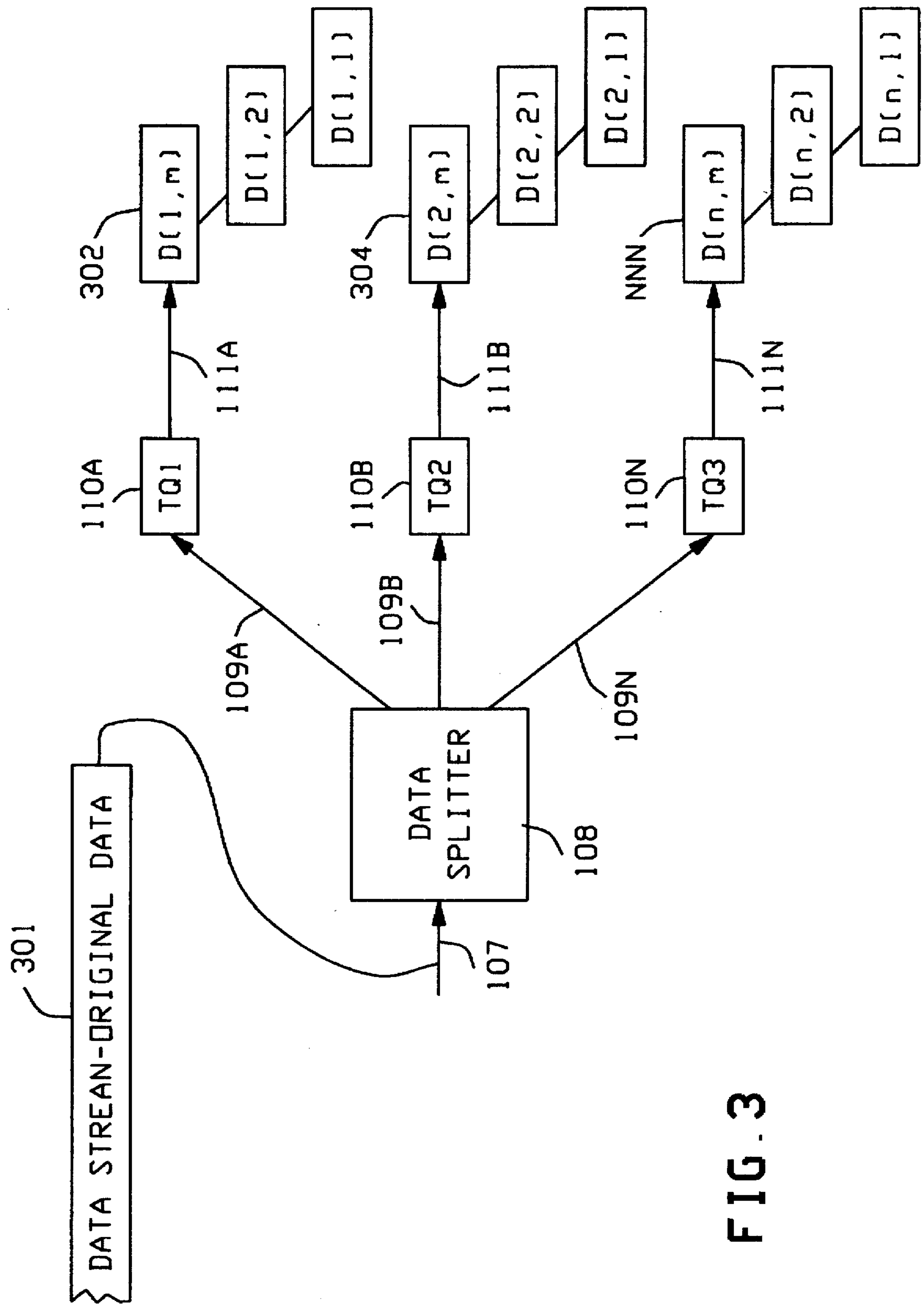
FIG. 3 is a block diagram showing a continuous data stream entering the data splitter 108 and being separated into individual packets (substreams).

In step 204, the data splitter 108 splits the single continuous data stream into N separate substreams by packaging the data into packets, which may be variable sizes. The packet size is dependent on the characteristics of the transmitters and receivers and is determined at the time the network connections are established. FIG. 3 shows part of a continuous data stream and an example packet. In this description and throughout the figures, N represents any number greater than 1.

In steps 206 and 208, after each packet is generated it is sent from the data splitter 108 to queues 110 and stored (e.g., queued). Each queue 110 has the ability to store a plurality of packets having variable sizes. Typically, the packets are sent in round robin fashion to queues 110. For example, packet 302 in FIG. 3 is sent to transmit queue 110A, first, then packet 304 is sent to transmit queue 110B, until packet NNN is sent to queue 110N. At that time a new packet is sent to queue 110A and the process repeats in the same manner, until data transmission is complete.

Next, in step 210 transmitters 112 read packets from their respective queues. In a preferred embodiment, transmitters 112 are identified as Burroughs Network Architecture (BNA) transport hardware and software by Unisys Corporation, and are available for sale in a variety of potential configurations for use in LAN and WAN configurations. It is assumed that each transmitter are capable of sending packets of data to a receiver with data integrity checks and employ data compression if so configured. Further, it is also assumed that these transmitters have the ability to locate, on a dynamic basis, alternative paths and equipment to provide the potential for arbitrary high network transmission availability. It is also assumed that standard transmission links 113 are employed such as data telephone lines, fiber optic cables, etc. Additionally, it is possible to have one link 113 or multiple links corresponding to the quantity of transmitters and receivers. If a single link is employed, then it is necessary to mark each substream packet with a unique identity and multiplex the transmitters.

As data is sent from transmitter queues 110 it is transmitted by transmitters 112, in round-robin fashion. Each transmitter 112 then transfers a packet sequentially to one or more data receivers 114. Typically, transmitter 112A transmits to its corresponding receiver 114A. However, there is no requirement to have a one-to-one mapping. On the first transmission, the transmitters 112 and receivers must handshake to make sure that proper round robin order is established. One designated transmitter and one designated receiver communicate before data is transmitted. They exchange control messages that will govern the flow of data for all of the transmitters and receivers. The transmitter and receiver communicate the number of logical data substreams which will be used, the identity of each substream, and the order in which substream will be used. Each substream will have its own unique identity, and all data packets in a given substream will have the identity of the substream. Transmitter speed can be adjusted (depending the transmitters used) to meet an application specific requirement. Transmitter data transfer rates typically range between 1.54 mega bits per second to 10 mega bits per second. Higher throughput can be achieved by increasing the number of transmitters 112 and receivers 114.

Next, in steps 212, 214 receivers 114 receive packets from transmitter 112 via link 113. The transmission links are assumed to guarantee data packet ordering as presented by the input data packet queues. The receiving side initializes as many receivers as needed, or as many data receive substreams as are required, using as many receivers as are available. Each receiver guarantees that correct ordering of received packets in their respective queues 116. Receivers 114 also guarantee that data is integrity checked and are able to handle retransmitted packets as needed.

Next, in step 216, the substream reassembly unit 118, polls each receiver queue 116 for data packets. Receiver queues 116 are polled in the same prearranged order as the round robin method described earlier. Then, the substream reassembly unit 118 reassembles the packets into a final output stream and is sent to FIFO 120 (typically the same size as FIFO 106) via bus 119. Then in step 218, the host processor 122 reads the continuous data stream.

FIG. 3 is a block diagram showing a continuous data stream 301 entering the data splitter 108 and being separated into individual packets 302, 304, and NNN.

Before the data splitter can supply packets of data to the transmitters, the data splitter determines how many logical transmitters are available. This is done by a configuration input file to the transfer process or in some cases by predetermined convention. An important aspect of the data splitters is that data is spread across logical connections (i.e., logical transmitter/receivers.) As the data splitter initializes each logical connection, the logical connections interrogate the data network for physical connections to a target host computer. If there is only one physical transmitter/receiver pair between a pair of hosts, then all logical connections will actually use the same physical connection, but with separate logical conversations. If there are multiple physical transmitter/receiver pairs, ideally at least as many as logical connections, then the data splitter spreads the logical connections across the physical connections. It should be noted that while it may seem unusual to use multiple logical connections if there is only one physical transmitter/receiver pair, that because extensive physical buffering (the FIFO's) is associated with each logical connection, data transmission is improved since a larger total of queued data packets is available to a data transmitter. The intent, however, is normally to have at least enough physical transmitter/ receiver pairs to allow only one logical conversation per path. Further, that transmitter/receiver pair can be completely independent of each other.

During network connection setup, the dam splitter interrogates each logical path to determine the allowable maximum data packet size permitted by the underlying physical transport system. By design convention, the data splitter selects one of the logical connections as the first connection to the other host computer. This connection is established first and involves the sending of greetings and setup parameters between the data splitter and the data packet reassembly unit. Setup parameters include the number and exact identity of logical channels which will be used and the ordering of logical channels as will be used during the data transmission phase of data transfer. This is important as the data reassembly unit must have the identical number of logical channels as the transmission side and it must use them in the identical order to the transmit side.

It should be noted that this design assumes that each data transmit/receive pair preserves the order in which data is sent and that built into the transmission system is a guaranteed delivery concept that data either will be guaranteed to be delivered or an error will be provided. Examples of packet data transport systems which have this characteristic are Burroughs Network Architecture (BNA) version 2, TCP/IP, IBM SNA transport services. The preferred embodiment of this design is the Unisys Corporation BNA version 2 transport system which operates across a variety of physical network choices such as: ETHERNET, Unisys CPLAN, and wide area connections with single or concurrent multiple parallel links, each at up to T1 speeds.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A high speed data transfer system for transferring large files as a continuous data stream from a transmitting host computer to a receiving host computer, comprising:

a source of large files coupled to said transmitting host computer, queuing means coupled to receive said data from said transmitting host computer and programmable by said transmitting host computer to provide said continuous data stream, a data splitter having an input coupled to the output of said queuing means for receiving said continuous data stream and coupled to and controlled by said transmitting host computer for separating the continuous data stream into a plurality of separate data substreams at the outputs of said data splitter, a transmitter unit coupled to each of said data splitter outputs adapted to receive individual data substreams of continuous data defined by said transmitting host computer, a receiver unit coupled to respective ones of said transmitter units via a transmitting link for receiving said individual data substreams of continuous data, receiving queues, one coupled to each of said receiver units for stacking said individual substreams of continuous data in an individual queue, a reassembly unit coupled to said receiving queues and to said receiving host computer for receiving said individual substreams of continuous data from said receiving queues in a defined order and for reassembling said substreams into said continuous data stream for presentation to said receiving host computer.

2. The system of claim 1, wherein the source of large files comprises a mass memory device for providing a asynchronous blocks of data comprising a predetermined number of bytes.

3. The system of claim 2 wherein said source of files comprises a disk drive system.

4. The system of claim 1, wherein said queuing means comprises a first-in-first-out queue coupled between said transmitting host computer and said date splitter for supplying said continuous data stream.

5. The system of claim 1, wherein the transmitting unit further comprises at least one transmitting queue coupled to each output of said data splitter.

6. The system of claim 1, further comprising a plurality of data links one coupled to each of said receiver units.

7. The system of claim 1, further comprising at least two different types of data links and wherein individual data links are coupled to individual receiver units.

8. The system of claim 7 which further comprises a second disk drive coupled to the output of said receiving host computer.

* * * * *